United States Patent
Schöpf et al.

(10) Patent No.: US 9,826,155 B2
(45) Date of Patent: Nov. 21, 2017

(54) DETECTING A DOCUMENT

(71) Applicant: DocuWare GmbH, Germering (DE)

(72) Inventors: Mirco Schöpf, Wörthsee (DE); Dmitri Toropov, Ebersberg (DE)

(73) Assignee: DOCUWARE GMBH, Germering (DE)

( * ) Notice: Subject to any disclaimer, the term of this patent is extended or adjusted under 35 U.S.C. 154(b) by 0 days.

(21) Appl. No.: 14/242,564

(22) Filed: Apr. 1, 2014

(65) Prior Publication Data

US 2014/0294305 A1    Oct. 2, 2014

(30) Foreign Application Priority Data

Apr. 2, 2013  (DE) .................. 10 2013 005 658

(51) Int. Cl.
| | |
|---|---|
| *H04N 5/00* | (2011.01) |
| *G06K 9/00* | (2006.01) |
| *H04N 5/232* | (2006.01) |
| *G06K 9/03* | (2006.01) |

(52) U.S. Cl.
CPC ......... *H04N 5/23248* (2013.01); *G06K 9/036* (2013.01); *H04N 5/23254* (2013.01); *G06K 9/00442* (2013.01); *G06K 2209/01* (2013.01)

(58) Field of Classification Search
USPC ....................................... 382/182
See application file for complete search history.

(56) References Cited

U.S. PATENT DOCUMENTS

| | | | |
|---|---|---|---|
| 3,069,654 A | 5/2000 | Moynihan | |
| 8,699,090 B1 * | 4/2014 | Madhani ............ | H04N 1/00307 358/1.15 |
| 9,317,764 B2 * | 4/2016 | Baheti .................. | G06K 9/2054 |
| 2008/0239084 A1 * | 10/2008 | Endo ..................... | G03B 7/097 348/208.4 |
| 2009/0185042 A1 * | 7/2009 | Miyahara ............... | G03B 17/00 348/208.4 |
| 2009/0290809 A1 * | 11/2009 | Yamada ................. | G06T 7/0042 382/266 |
| 2011/0285874 A1 * | 11/2011 | Showering ............. | G06K 9/033 348/231.99 |
| 2012/0087537 A1 * | 4/2012 | Liu ..................... | G06K 9/00469 382/100 |
| 2012/0163728 A1 * | 6/2012 | Sun .......................... | G06K 9/32 382/260 |
| 2013/0070122 A1 | 3/2013 | Nijemcevic et al. | |

(Continued)

OTHER PUBLICATIONS

Becky. "Image Size." PhotoCrati. Aug. 25, 2010. Accessed Feb. 5, 2015. http://members.photocrati.com/image-size-resolution/.*

(Continued)

*Primary Examiner* — Utpal Shah
(74) *Attorney, Agent, or Firm* — Knobbe, Martens, Olson & Bear LLP

(57) ABSTRACT

A method is proposed for detecting a document in which image data are recorded by means of a camera, in which filtered picture data are determined by a first processing unit on the basis of the recorded image data, and a camera picture is stored by a second processing unit on the basis of the filtered picture data if a stability criterion is fulfilled. Also specified correspondingly are a device, computer program product and storage medium.

23 Claims, 1 Drawing Sheet

(56) References Cited

U.S. PATENT DOCUMENTS

2014/0168478 A1* 6/2014 Baheti .................. G06K 9/2081
348/240.99

OTHER PUBLICATIONS

Bhaskar, Sonia, Nicholas Lavassar, and Scott Green. "Implementing Optical Character Recognition on the Android Operating System for Business Cards." (2010).*

Duda, Richard. "Use of Hough Tranformation to Detect Lines and Curves in Pictures." Graphics and Image Processing 15, No. 1 (1972): 11-15. Accessed Feb. 5, 2015. http://www.cse.unr.edu/~bebis/CS474/Handouts/HoughTransformPaper.pdf.*

Canny, John, "A Computational Approach to Edge Detection", IEEE Transactions on Pattern Analysis and Machine Intelligence, Nov. 1986, pp. 679-698, vol. PAMI-8, Issue 6.

"Hough-Transformation", aus Wikipedia, der freien Enzyklopädie, printed Feb. 28, 2013, web address http://de.wikipedia.org/wiki/Hough-Transformation.

Machine translation, "Hough Transform", From Wikipedia, the free encyclopedia, printed May 20, 2014, web address http://de.wikipedia.org/wiki/Hough-Transformation.

* cited by examiner

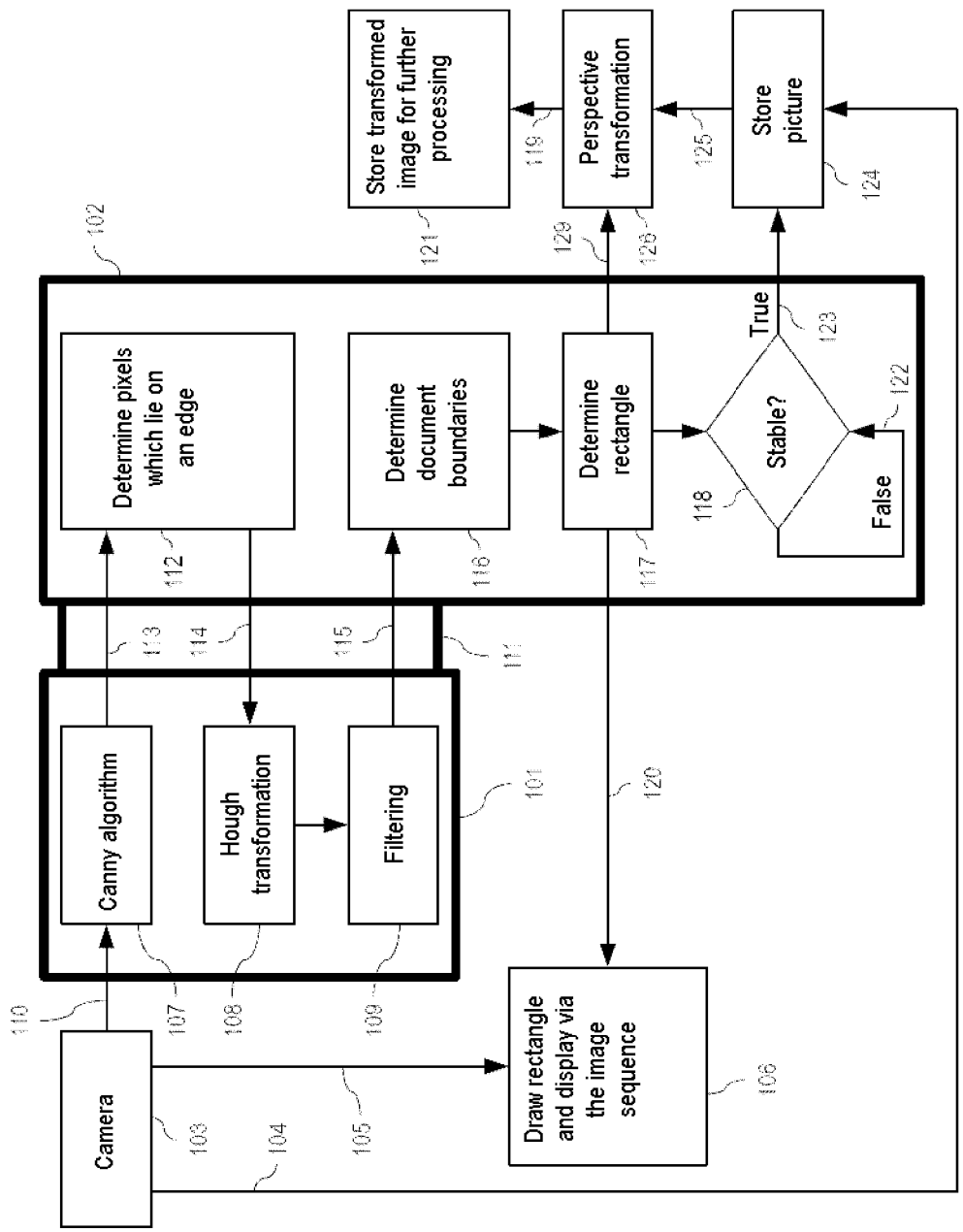

DETECTING A DOCUMENT

INCORPORATION BY REFERENCE TO ANY PRIORITY APPLICATIONS

Any and all applications for which a foreign or domestic priority claim is made are identified in the Application Data Sheet filed with the present application and are incorporated by reference under 37 CFR 1.57 and made a part of this specification.

BACKGROUND

Field of the Invention

The invention relates to the detection of a document, in particular for further processing in a character recognition unit and/or a document management system.

Background Art

Different methods are known for text recognition (also denoted as optical character recognition, OCR) which can be used to carry out automated text recognition within images. The images are, for example, electronically scanned documents whose contents are to be further analysed.

The documents can be electronic documents, for example, electronically processed, pre-processed or processable documents. By way of example, the approach can be used for applications which relate to document management and/or document archiving, for example, of business documents, or for other types of data extraction, for example, extraction of information from photographed till receipts and other small documents.

Known approaches are executed by image processing algorithms for a central processor unit (CPU). This involves resources in the central processor unit which are then not available for other tasks. In particular, fast image recognition, for example in real time or virtually in real time, is no longer possible in this case or requires a central processor unit with substantial reserve capacities, and this, in turn, renders the device for document detection more expensive.

A further disadvantage consists in that a user who takes a picture with a camera and then wishes to have said picture further processed with the aid of image recognition software, must often take the picture repeatedly until a result that is sufficiently good for further processing (for example a sharp image or complete image) is available. In particular, it is a disadvantage when the user shakes the camera when operating a shutter release.

SUMMARY OF THE INVENTION

An object of the disclosure is to provide improved and more efficient detection and/or processing of electronic documents. In particular, it is an object to facilitate the detection of a document for a user, and/or to ensure that the user more quickly obtains better recognition results of electronic documents.

This object is achieved in accordance with the features of the independent claims. Preferred embodiments can, in particular, be gathered from the dependent claims.

In order to achieve the object, a method is proposed for detecting a document,
  in which image data are recorded by means of a camera,
  in which filtered picture data are determined by a first processing unit on the basis of the recorded image data, and
  in which, if a stability criterion is fulfilled, a recording of the camera is stored by a second processing unit on the basis of the filtered picture data.

The image data can be pictures, images carried out consecutively, a video or an image stream. The document can be a printed or electronic original which is converted into image data by means of the camera. The picture therefore constitutes a digitized representation of the document, which can, for example, be further processed with the aid of a document management system, including, in particular, optical character recognition (OCR).

The picture data, in particular the filtered picture data, can be data relating to the content of the picture, for example, metadata, and/or image data. In particular, a filtered picture can comprise metadata and/or image data. Filtering of the picture can, in particular, include transformation into image data or other data, for example, metadata.

One advantage therefore consists in simplifying the scanning of different documents, for example with the aid of a portable device (also referred to as a mobile device), for example, a mobile telephone or a so-called smartphone. The improved processing speed virtually delivers the user real time feedback, for example, before or during the scanning operation, or during and/or after the recognition of the electronic document. In particular, the acquisition of the document by means of the camera can be supported such that erroneous operation or unnecessary repetitions of picture taking are reduced or prevented.

It follows that with the aid of the camera of the portable device the user can, for example, acquire a document free-handedly; the fast processing in accordance with the present solution renders possible the recognition, for example, of the document edges in real time, or almost in real time. The picture taken can be, for example, initiated automatically when the user holds the camera still for a prescribed period. This prevents the user from having to actuate the shutter release manually and thereby shaking and thus necessitating repetition of picture taking until one of the pictures can deliver sufficiently good recognition results for further processing, such as, OCR processing.

The further processing preferably comprises optical character recognition (OCR). For example, the portable device can be used to carry out the acquisition of the document and/or the further processing of the document by means of optical character recognition. The further processing can also optionally be carried out by another unit, for example, a component or structure connected via a network. For example, the document acquired by the portable device can be transmitted to a server or to a server structure (comprising a plurality of computers) and be further processed there. The result of the further processing can be transmitted wholly or in part to the portable device, or be offered to the portable device, for example via an interface of the network. By way of example, the network can be an IP network, a LAN, a WAN, the Internet or a part of the Internet (for example an intranet).

The communication between the portable device and the network can be performed, for example, via a wireless or a hardwired interface. The wireless interface can be a WLAN, Bluetooth, a near field communication interface or some other radio interface, for example, a mobile radio interface.

One embodiment is for the first processing unit to comprise a graphic processor unit (GPU).

Another embodiment is for the second processing unit to comprise a central processor unit (CPU).

The processing power of a mobile device can therefore be distributed over the existing processing units, and virtually real time feedback to the user is thereby achieved.

One particular embodiment is for the camera, the first processing unit and the second processing unit to be part of a portable device, in particular a smartphone.

It is also an embodiment for the camera to provide the image data of the first processing unit in a first resolution, and for the picture to be stored in a second resolution by the second processing unit.

For example, the second resolution can be higher than the first resolution.

It is also an embodiment for the first resolution to correspond to the resolution of a display unit.

The display unit is, in particular, the display unit of the portable device.

The processing can thus be performed at least partially on the basis of the reduced second resolution, for example the picture with the higher, if appropriate, full first resolution then being used for further processing, for example, in the context of optical character recognition.

Another embodiment consists in that at least one of the following steps is carried out with the aid of the first processing unit:
  a first filtering operation is carried out in accordance with a Canny algorithm;
  a texture determined by means of the filtering operation in accordance with the Canny algorithm is transmitted to the second processing unit;
  a Hough transformation is carried out on the basis of stored coordinates which are provided by the second processing unit;
  a second filtering operation is carried out on the basis of the Hough transformation, and a filtered texture is passed on to the second processing unit.

In particular, what is involved can be a black and white texture or a coloured texture.

One embodiment is for the stored coordinates to be determined by the second processing unit, wherein pixels are determined which lie on an edge or substantially on an edge, and the coordinates of said pixels are stored.

In an alternative embodiment, with the aid of the second filtering operation, pixels are filtered out in a Hough space where not sufficiently many points lie on a line.

In some embodiments, with the aid of the filtered texture from the second processing unit, document boundaries are determined and superimposed, particularly in the form of a frame, on the image data displayed on a display unit.

It is also an embodiment to determine whether the frame and/or the image data are stable and, if this is the case, the camera picture is stored.

One embodiment consists in determining whether the frame and/or the image data are stable by means of at least one of the following approaches:
  the image data are analysed over a prescribed period and the picture is stored when the change in them is below a prescribed threshold value;
  the frame is analysed over a prescribed period and the picture is stored when the change in it is below a prescribed threshold value;
  the picture is stored when a slight shaking is detected; and
  the picture is stored when the frame runs round a document or round a specific region of the document.

The present approaches can be implemented individually or in combination(s) with one another.

In particular, it is possible to provide a sensor which can determine a movement, and therefore shaking, of the portable device. For example, a picture can be stored whenever the sensor determines movement of the portable device below a prescribed threshold value. It is preferably possible, in addition, to check the condition as to whether the frame document runs around the document or around a suitable region of the document. It can thus be ensured that the user on the one hand holds the portable device as steadily as possible, and that the frame runs around the document to be detected. Both are preconditions for a high level of optical character recognition in the context of subsequent document processing.

It is an additional refinement for a transformed image to be determined by carrying out a perspective transformation of the picture with the aid of the coordinates of the frame.

Another refinement is that the transformed image is further processed by means of character recognition.

It is also possible for the character recognition to be carried out at least partially on the first processing unit or the second processing unit.

It is also a further refinement for the character recognition to be carried out at least partially on an external processing unit which is coupled at least temporarily via a wireless or hardwired communication link.

In particular, it is an embodiment to transform the stored picture, for example, by means of a perspective transformation.

The stored picture can optionally be processed by document recognition.

The present explanations relating to the method are valid correspondingly for the other categories of claim. For example, each of the devices can be embodied in one component or distributed in a plurality of components.

In order to achieve the object, a device for detecting a document is proposed
  having a camera, a first processing unit and a second processing unit,
  the camera being able to record image data,
  filtered picture data being able to be determined with the aid of the first processing unit on the basis of the recorded image data,
  a camera picture being able to be stored with the aid of the second processing unit on the basis of the filtered picture data if a stability criterion is fulfilled.

It is a development for the first processing unit to comprise a graphics processor unit and for the second processing unit to comprise a central processor unit.

In accordance with one refinement, the device is a portable or mobile device, in particular a tablet computer or a smartphone, with a wireless or hardwired communication interface.

It is another refinement for the first processing unit and/or the second processing unit to be set up to carry out character recognition on the basis of the picture.

It is also a refinement for the device to be set up to transmit the picture to a further device, it being possible for the further device to carry out document processing on the basis of the picture.

The further device can be a component, for example a computer or a plurality of computers, connected via a network, for example the Internet.

Also proposed is a system comprising at least one of the devices described herein.

The solution presented here further comprises a computer program product which can be directly loaded into a memory of a digital computer, comprising program code parts which are suitable for carrying out steps of the method described here.

Furthermore, the above-named problem is solved by means of a computer-readable storage medium, for example any desired memory, including instructions (for example in the form of program code) which can be executed by a computer and are suitable for the computer to carry out steps of the method described here.

The above-described properties, features and advantages of this invention, as well as the way said features are achieved, become more clear and more clearly understandable in conjunction with the following schematic description of exemplary embodiments, which are explained in more detail in conjunction with the subsequent part described in the figures. In this case, elements which are the same or act in the same way can be provided with the same reference symbols for the sake of clarity.

BRIEF DESCRIPTION OF THE DRAWINGS

FIG. 1 shows a schematic flowchart having steps which can be carried out at least partially on a portable device, for example a smartphone, and which render possible efficient detection and further processing of a document.

DETAILED DESCRIPTION

The present solution makes use, in particular, of algorithms for edge detection and for the perspective correction of a picture of a document. It is proposed to split the image processing tasks between two processing units of a device, for example, a central processor unit (CPU) and a graphics processor unit (GPU). The device can be a portable or mobile device (for example a smartphone, a tablet computer or a mobile computer). The device preferably has an integrated or connectable scanning device, for example, a camera.

This means that it is possible that, for example, the edge detection of a document to be further processed can be carried out in real time, and, when recording the document by means of the camera of the portable device, the user obtains feedback in real time, or almost in real time, when the picture can be taken or when the picture has been taken.

FIG. 1 shows a schematic flowchart having steps which can be carried out at least partially on a portable device, for example a smartphone, with a camera 103, a graphics processor unit (GPU) 101 and a central processor unit (CPU) 102, with GPU 101 and CPU 102 being, for example, coupled to one another via a common memory 111:

(1) By way of example the camera 103 continuously delivers images (also denoted as a picture, a video or an image stream).

The image stream can be provided in different resolutions, for example in a resolution of the display unit, and be further processed. If the camera can provide a relatively high resolution, it can be advantageous for the image stream to select a camera resolution which is equal to or less than the resolution of the display unit.

For example, the image stream 105 is used in the resolution of the display unit and displayed on the display unit. A rectangle to be determined can be displayed together with the image stream 105 on the display unit (see arrow 120 and block 106 and subsequent description in this regard).

Furthermore, the image stream 110 is provided to the GPU 101 in the resolution of the display unit (if appropriate also in a resolution preferably reduced by comparison with the maximum resolution of the camera), for example with 640 times 480 pixels.

By way of example, an (if appropriate black and white or monochrome) pixel image can be produced on the basis of the image stream in accordance with "A Computational Approach to Edge Detection", IEEE, USA, 1986 (hereafter "[Canny1986]"), with the aid of the GPU 101 (compare step 107). After application of the filter in accordance with [Canny1986] a black and white texture 113 is present in which the pixels, which lie on edges, are coloured white.

(2) Said texture 113 can be passed on to the CPU for processing, for example in a reduced resolution (for example, 640 times 480 pixels).

(3) In a step 112, pixels which lie on an edge are determined and their coordinates are stored.

(4) The stored coordinates 114 are transmitted to the GPU 101 in order to carry out a so-called Hough transformation 108 in accordance with U.S. Pat. No. 3,069,654 and http://de.wikipedia.org/wiki/Hough-Transformation.

Each point in a normal space corresponds to a line in a Hough space. The lines are transmitted to a texture such that a pixel becomes brighter the more the lines run through said pixel. Each pixel (and so its coordinates) in the Hough space corresponds in this case to a line in normal space. The more (edge) points that lie on the line in normal space, the higher the brightness of said pixel becomes.

(5) Those points in Hough space are filtered out (compare filtering 109), where not sufficiently many points lie on the corresponding line. This can be performed, for example, by means of a threshold value comparison, that is to say it can be determined whether at least one specific number of points lie on the line.

Said filtering 109 results in a texture 115, which is passed on to the CPU 102 for further processing.

(6) The CPU 102 searches in the texture obtained for those lines which bound the document (compare step 116). A rectangle (also denoted as a frame) is determined from said edges (compare step 117) and coordinates of the rectangle are buffered for use, for example, subsequent perspective correction (see arrow 129).

(7) A suitable algorithm is used to determine whether the image is stable (compare step 118).

By way of example, a stability recognition of the image can be carried out by the coordinates of the corners of the document obtained by the algorithm. The image can therefore be recognized as stable if the coordinates of the corners of the document move by less than a prescribed threshold value during a specific time. Alternatively or additionally, the coordinates of the corners can be processed with the aid of a filter algorithm in order to highlight specific properties: thus, a lowpass filter can be used, for example, to reduce or eliminate slight rapid changes in coordinates which are based, for example, on a numerical instability of the filter algorithms. Furthermore, it is possible to process the changes in coordinates by a filter (for example a lowpass filter).

This is advantageous when the user is holding the portable device freely in his hand such that the individual pictures of the image stream are varied (shake) owing to the movement of the hand. A "shaky" picture can lead to a poor recognition performance of a downstream document recognition (for example in the form of OCR processing).

By way of example the image stream is analysed over a specific period, and use is made for further processing of that picture which is least shaky. Thus, it is possible to determine automatically an instant from a multiplicity of instants at which the user holds or has held the camera as steady as possible. It is then possible to evaluate the gradient in the image stream in such a way as to select that picture from a set of pictures which exhibits a small variation (that is to say a small gradient). The set of pictures can be compiled during a prescribed period (a time window).

Alternatively, an instance of shaking can be measured by means of a suitable sensor, and an (at least one) picture of the image stream can be stored when the shaking is below a prescribed threshold value.

An additional criterion for a suitable picture is that the frame covers the recorded document or the desired recorded region of the document (or runs round said document or round a part of the document). Thus, as soon as the user moves the camera it can automatically be detected that the edges round the document can no longer be determined. In such a case, the user can, for example, be advised to move the camera in a specific direction. Alternatively, it is possible to output an optical, acoustic or haptic message that at the moment it is highly likely that to take a picture would not lead to the desired result.

This step of the cycle determines the optimum (most stable) moment to take a picture with which an optimum result can be obtained in document detection.

(8) If it is determined (compare arrow 123 in the case when the picture and/or the frame is/are stable and arrow 122 in the case when the picture and/or the frame is/are not stable) that an image is stable, that is to say when, for example, shaking is slight and/or the frame is/are stable, in a step 124 the picture is stored with a prescribed resolution, for example, with the maximum resolution of the camera 103 (compare arrow 104).

The previous steps are preferably performed at least partially with a reduced resolution of the picture and/or the image stream, in order to reduce the data volume to be processed. Processing is faster as a result, therefore it is possible to have recourse to less powerful and therefore less costly components (GPU and/or CPU).

(9) The coordinates 129 determined in step (6) are used in order, on the basis of the picture 125 stored in step 124, to carry out a perspective transformation 126 of the high resolution image.

(10) The resultant perspective transformed image 119 is stored in a prescribed file format (for example as PNG file) and further processed by a document management system (compare step 121). The document management system can be part of the portable device or be designed to be separate therefrom.

The present solution enables the distributed application of image recognition algorithms on a central processor unit and on a graphics processor unit. This constitutes a precondition for detecting documents by means of portable devices. In particular, it is thus possible to carry out document recognition and/or document detection in real time, or almost in real time.

Consequently, documents can be detected by means of portable devices quickly and without any problem and in high quality for further document processing. The "mobile detection" of documents provides input data which, in turn, enable good OCR results of document processing. This substantially reduces outlay on document detection and promotes user acceptance, because the scanning operation of the document can be carried out simply and virtually everywhere with the aid of the portable device, for example a smartphone with camera.

Although the invention has been illustrated in detail and described by the at least one exemplary embodiment shown, the invention is not restricted thereto, and other variations can be derived herefrom by a person skilled in the art without departing from the scope of protection of the invention.

What is claimed is:

1. A method for detecting a document, the method comprising:
   recording image data by a camera, wherein the image data comprises an image stream at a first resolution;
   determining, by a first processing unit, filtered picture data based, at least in part, on the image data at the first resolution, wherein the first processing unit is a graphics processing unit;
   determining document boundaries based at least in part on the filtered picture data;
   determining a frame based on the document boundaries;
   determining whether at least one of the frame or the image data is stable; and
   based on a determination that the frame or the image data is stable, storing a camera picture in a second resolution, by a second processing unit, wherein the camera picture is based, at least in part, on the filtered picture data, wherein the second resolution is higher than the first resolution.

2. The method of claim 1, wherein the second processing unit comprises a central processor unit.

3. The method of claim 1, wherein the camera, the first graphics processing unit and the second processing unit are part of a portable terminal.

4. The method of claim 1, wherein the first resolution corresponds to the resolution of a display unit.

5. The method of claim 1, wherein the following steps are performed with the aid of the first processing unit:
   performing a first filtering operation in accordance with a Canny algorithm to generate a Canny filtered texture;
   transmitting the Canny filtered texture to the second processing unit;
   performing a Hough transformation based, at least in part, on stored coordinates provided by the second processing unit;
   performing a second filtering operation based, at least in part, on the Hough transformation to generate a Hough filtered texture; and
   passing the Hough filtered texture to the second processing unit.

6. The method of claim 5, further comprising determining, by the second processing unit, the stored coordinates by determining pixels which lie on an edge, and storing coordinates of said pixels.

7. The method of claim 5, wherein, with the aid of the second filtering operation, pixels are filtered out in a Hough space where less than a threshold number of points lie on a line.

8. The method of claim 5 further comprising, with the aid of the filtered picture data from the second processing unit, superimposing the document boundaries, in the form of the frame, on the image data displayed on a display unit.

9. The method of claim 1, wherein determining whether the frame and/or the image data are stable comprises at least one of:
   analyzing the image data over a prescribed period and determining if a change in the image data is below a prescribed threshold value;
   analyzing the frame over a prescribed period and determining if a change in the frame is below a prescribed threshold value;
   determining when a shaky hand movement occurs; and
   determining when the frame is around a document or around a specific region of the document.

10. The method of claim 8 further comprising determining a transformed image by carrying out, based at least in part on the stored coordinates, a perspective transformation of the camera picture.

11. The method of claim 10, wherein the transformed image is further processed by means of character recognition.

12. The method of claim 11, wherein the character recognition is carried out at least partially on the first processing unit or the second processing unit.

13. The method of claim 11, wherein the character recognition is carried out at least partially on an external processing unit which is coupled at least temporarily via a wireless or hardwired communication link.

14. A device for detecting a document, the device comprising:
a camera having a first processing unit and a second processing unit, wherein the first processing unit is a graphics processing unit, wherein the camera is configured to:
record image data, wherein the image data comprises an image stream at a first resolution;
determine, by the first processing unit, filtered picture data, based, at least in part, on the recorded image data at the first resolution; and
determine, by the second processing unit, document boundaries based at least in part on the filtered picture data;
determine, by the second processing unit, a frame based on the document boundaries;
determine, by the second processing unit, whether at least one of the frame or the image data is stable; and
based on a determination that the frame or the image data is stable, store a camera picture at a second resolution, by the second processing unit, wherein the camera picture is based, at least in part, on the filtered picture data if a stability criterion is fulfilled, wherein the second resolution is higher than the first resolution.

15. The device of claim 14, wherein the second processing unit comprises a central processor unit.

16. The device of claim 14, wherein the device is a portable or mobile device, in particular a tablet computer or a smartphone, with a wireless or hardwired communication interface.

17. The device of claim 14, wherein the first graphics processing unit and/or the second processing unit are/is configured to perform character recognition on the picture.

18. The device of claim 14, wherein the device is configured to transmit the picture to a different device, it being possible for the different device to carry out document processing on the picture.

19. The device of claim 14, wherein the device is a portable or mobile device, including a tablet computer or a smartphone, having a wireless or hardwired communication interface.

20. A non-transitory computer-readable storage medium storing computer executable instructions that, when executed by a computer, configure the computer to perform operations comprising:
recording image data by a camera, wherein the image data comprises an image stream at a first resolution;
determining, by a first processing unit, filtered picture data based, at least in part, on the recorded image data at the first resolution, wherein the first processing unit is a graphics processing unit;
determining, by the second processing unit, document boundaries based at least in part on the filtered picture data;
determining, by the second processing unit, a frame based on the document boundaries;
determining, by the second processing unit, whether at least one of the frame or the image data is stable; and
based on a determination that the frame or the image data is stable, storing a camera picture in a second resolution, by a second processing unit, wherein the camera picture is based, at least in part, on the filtered picture data, wherein the second resolution is higher than the first resolution.

21. The method of claim 1, wherein the stability criterion comprises:
determining coordinates of the corners of the document based on the image data; and
recognizing the image data as stable if the coordinates of the corners of the document move by less than a prescribed threshold value during a predetermined duration.

22. The method of claim 21, wherein the coordinates of the corners are processed with the aid of a filter algorithm.

23. The method of claim 22, wherein the filter algorithm uses a lowpass filter to reduce or eliminate slight rapid changes in coordinates.

* * * * *